United States Patent [19]
Arakawa

[11] Patent Number: 5,028,783
[45] Date of Patent: Jul. 2, 1991

[54] SHADING ELIMINATION METHOD FOR AN IMAGE READ-OUT APPARATUS

[75] Inventor: Satoshi Arakawa, Kanagawa, Japan

[73] Assignee: Fuji Photo Film Co., Ltd., Kanagawa, Japan

[21] Appl. No.: 397,815

[22] Filed: Aug. 24, 1989

[30] Foreign Application Priority Data

Aug. 24, 1988 [JP] Japan ................................. 63-210068
Aug. 24, 1988 [JP] Japan ................................. 63-210069
Aug. 24, 1988 [JP] Japan ................................. 63-210070

[51] Int. Cl.$^5$ .......................................... G01N 23/04
[52] U.S. Cl. .............................. 250/327.2; 250/484.1
[58] Field of Search ............... 250/327.2 A, 327.2 D, 250/327.2 G, 484.1 B; 364/413.13; 358/163

[56] References Cited

U.S. PATENT DOCUMENTS 4,734,783  3/1988  Horikawa ........................... 358/163
4,816,678  3/1989  Takasaki .......................... 250/484.1
4,816,679  3/1989  Sunagawa et al. ............... 250/484.1

FOREIGN PATENT DOCUMENTS

0140045  6/1986  Japan ................................ 250/327.2

Primary Examiner—Jack I. Berman
Assistant Examiner—Richard Hanig
Attorney, Agent, or Firm—Sughrue, Mion, Zinn, Macpeak & Seas

[57] ABSTRACT

A shading elimination method comprising these steps: before an image is detected as an image signal from a recording medium which has the image recorded thereon, the characteristics of shading caused by nonuniformity in how a photoelectric read-out device detects light emitted from the recording medium when it is exposed to a light beam, or the like are detected. The characteristics of the shading are detected from operations wherein a linear light source, composed of point light sources arrayed linearly with the intensities of light measured in advance, is positioned facing the photoelectric read-out device; the point light sources are sequentially turned on; the intensities of the light produced by the point light sources are detected by the photoelectric read-out device; and the intensities of the light thus detected are compared with the intensities of light measured in advance. Fluctuations in the image signal, caused by shading, are eliminated based on the characteristics of the shading.

15 Claims, 7 Drawing Sheets

SHADING ELIMINATION METHOD FOR AN IMAGE READ-OUT APPARATUS

BACKGROUND OF THE INVENTION

1. Field of the Invention

This invention relates to a method of compensating for fluctuations in an image signal caused by the nonuniformity in how a photoelectric read-out means detects light emitted from (or reflected by, etc.) a recording medium, or the like, in an image read-out apparatus. In the image read-out apparatus, the recording medium, on which an image has been recorded, is exposed to a light beam in order to cause light carrying information about the image to be emitted from the recording medium, and the light is photoelectrically detected and converted into an image signal. This invention also relates to a method of compensating for fluctuations in an image signal caused by nonuniformity in the intensity of stimulating rays, nonuniformity in how a photoelectric read-out means detects light emitted by a stimulable phosphor sheet, or the like, in a radiation image read-out apparatus. In the radiation image read-out apparatus, the stimulable phosphor sheet, on which a radiation image has been stored, is exposed to stimulating rays which cause the stimulable phosphor sheet to emit light in proportion to the amount of energy stored thereon during exposure to radiation; and the light is photoelectrically detected, and converted into an image signal.

2. Description of the Prior Art

Image read-out apparatuses, wherein a recording medium, on which an image has been recorded, is exposed to a light beam, and light reflected by the recording medium, light which has passed through the recording medium, or light emitted by the recording medium is detected in order to allow the image to be read out, have heretofore been used as, for example, scanners for plate making and input means for computers and facsimiles. The image read-out apparatuses are also used as radiation image read-out apparatuses in radiation image recording and reproducing systems, wherein stimulable phosphor sheets are used, as proposed by the applicant in, for example, U.S. Pat. Nos. 4,258,264 and 4,346,295 and Japanese Unexamined Patent Publication No. 56(1981)-11395.

Specifically, when certain kinds of phosphors are exposed to radiation such as X-rays, α-rays, β-rays, γ-rays, cathode rays, or ultraviolet rays, they store part of the energy of the radiation. Then, when the phosphor, which has been exposed to the radiation, is exposed to stimulating rays such as visible light, light is emitted by the phosphor in proportion to the amount of energy stored during exposure to the radiation. A phosphor exhibiting such properties is referred to as a stimulable phosphor. In the aforesaid radiation image read-out apparatuses, a sheet provided with a layer of the stimulable phosphor (hereinafter referred to as a stimulable phosphor sheet) is used. The stimulable phosphor sheet is first exposed to radiation which has passed through an object such as the human body in order to store a radiation image of the object thereon, and is then exposed to stimulating rays which cause the stimulable phosphor sheet to emit light in proportion to the amount of energy stored during exposure to the radiation. The light emitted by the stimulable phosphor sheet upon stimulation thereof is photoelectrically detected and converted into an electric image signal.

In the image read-out apparatuses described above, a photoelectric read-out means is used to detect light which is emitted from the recording medium when it is exposed to a light beam and which carries information about the image recorded on the recording medium. By way of example, the photoelectric read-out means is constituted of a comparatively small photomultiplier and a light guide member, one edge face of which is positioned along a main scanning line on a recording medium, and the other edge face of which is positioned such that it is in close contact with the light receiving face of the photomultiplier. Alternatively, the photoelectric read-out means is constituted of a long photomultiplier which is positioned along a main scanning line on a recording medium, as disclosed in, for example, U.S. Pat. Application Ser. No. 141,259, or a line sensor which is positioned along a main scanning line.

However, with the image read-out apparatuses described above, the image signal generated by the photoelectric read-out means fluctuates, due to nonuniformity in how the photoelectric read-out means detects the light emitted from (or reflected by, etc.) the recording medium. The nonuniformity is caused by nonuniformity in how the light is guided by the light guide member along the main scanning direction, or by nonuniformity in the sensitivity of the long photomultiplier along the main scanning direction. In cases where the aforesaid nonuniformities cause the efficiency with which the light is detected to worsen (i.e. cause shading to occur), it becomes impossible to accurately detect the image which was recorded on the recording medium.

In order to eliminate the aforesaid problems, as disclosed in, for example, U.S. Pat. No. 4,734,783, the applicant has proposed apparatuses for eliminating shading, wherein the characteristics of the shading are detected in advance, and the image signal, the sensitivity of the photomultiplier or the like, is corrected in accordance with the position at which the light beam scan in the main scanning direction. Thereby, adverse effects from shading are eliminated.

Also, in order to detect the characteristics of the shading, a method is often employed wherein, for testing, the whole plane of a recording medium is exposed to radiation having a uniform intensity and is then scanned with a light beam before the image readout is carried out. Light emitted from the recording medium during the test scanning is detected by a photoelectric read-out means. Specifically, if the image read-out apparatus is free of shading, light emitted during the test from the whole plane of the recording medium which had been uniformly exposed to radiation can be detected as a constant. Therefore, the change in the value obtained from detection of the light emitted from the recording medium for test which has been uniformly exposed to radiation can be studied in order to detect the characteristics of the shading.

However, when the method described above is used to detect the shading characteristics, it is not possible to accurately achieve a uniform exposure of the recording medium to test the radiation. Specifically, the sources of radiation themselves generally cause the shading, and it is not always possible to obtain a source of radiation which can uniformly irradiate radiation to the whole plane of a recording medium for testing purposes. Moreover, even if a radiation source which uniformly produces radiation could be obtained, it is very difficult to fix the recording conditions for a uniform exposure. This is because nonuniformity in the distribution of radiation arises when the radiation source is located too close to the recording medium to test. In order to have the radiation source located sufficiently apart from the recording medium, a fairly large room for the recording is needed. Furthermore, the characteristics of the shading of the image read-out apparatuses change with the passage of time. Therefore, even if the characteristics of the shading of an image read-out apparatus were detected from operations wherein the recording medium used for testing has been uniformly exposed to radiation, it would become necessary for the user of the image read-out apparatus to detect the characteristics of the shading of the image read-out apparatus again after the user had used the image read-out apparatus for some period of time. In such cases, the user cannot detect the shading characteristics unless he has a source of radiation which uniformly irradiates radiation to a recording medium for testing purposes.

SUMMARY OF THE INVENTION

The primary object of the present invention is to provide a shading elimination method for an image read-out apparatus, wherein the characteristics of shading of the image read-out apparatus are detected accurately and easily without particular operations being carried out in order to uniformly expose a recording medium to radiation for testing purposes.

Another object of the present invention is to provide a shading elimination method for a radiation image read-out apparatus wherein the characteristics of shading of the radiation image read-out apparatus are detected accurately and easily without particular operations being carried out in order to expose uniformly a stimulable phosphor sheet to radiation for testing purposes.

The present invention provides a shading elimination method for an image read-out apparatus, wherein a recording medium which has an image recorded thereon is exposed to a light beam, and light which is emitted from the recording medium and which carries information about the image is detected, and converted into an image signal by a photoelectric read-out means, the shading elimination method comprising the steps of:

i) before said image is read out from said recording medium, the characteristics of the shading caused by nonuniformity in how said photoelectric read-out means detects the light which is emitted from said recording medium, or the like are detected, the characteristics of the shading being detected from operations wherein a linear light source composed of a plurality of point light sources, which are arrayed linearly and the intensities of light produced by which have been measured in advance, is positioned facing said photoelectric read-out means; said point light sources are sequentially turned on; the intensities of the light produced by said point light sources are detected by said photoelectric read-out means, and the intensities of the light thus detected are compared with said intensities of light which have been measured in advance, ii) storing said characteristics of the shading in a storage means, and iii) in the course of said image being read out from said recording medium, compensating for fluctuations in said image signal, which are caused by the shading, in accordance with the output of said storage means.

With the shading elimination method for an image read-out apparatus in accordance with the present invention, the intensities of light produced by the respective point light sources of the linear light source are detected by the photoelectric read-out means. The intensities of the light thus detected of the respective point light sources are compared with the intensities of light which have been measured in advance of the respective point light sources. Based on the differences between the detected intensities of the light and the intensities of light which have been measured in advance, the characteristics of the shading, caused by the nonuniformity in how the photoelectric read-out means detects the light which is emitted from the recording medium, or the like, are detected. Therefore, the characteristics of the shading can be detected without a particular radiation source being used in order to uniformly irradiate radiation to the whole plane of a recording medium, and the shading can be eliminated accurately and easily.

The present invention also provides a first shading elimination method for a radiation image read-out apparatus, wherein a stimulable phosphor sheet, which has a radiation image stored thereon, is exposed to stimulating rays which cause the stimulable phosphor sheet to emit light in proportion to the amount of energy stored thereon during exposure to radiation. The emitted light is detected and converted into an image signal by a photoelectric read-out means provided with a filter, which filters out light having wavelengths within the range of wavelengths of the stimulating rays, and transmits light having wavelengths within the range of wavelengths of the emitted light, the shading elimination method comprising the steps of:

i) before said radiation image is read out from said stimulable phosphor sheet, the characteristics of the shading caused by nonuniformity in the intensity of said stimulating rays, nonuniformity in the sensitivity of said photoelectric read-out means, or the like are detected, the characteristics of the shading being detected from operations wherein a phosphor sheet, which produces fluorescence capable of passing through said filter upon being exposed to said stimulating rays, is exposed to said stimulating rays, and the fluorescence produced by said phosphor sheet is detected by said photoelectric read-out means, ii) storing said characteristics of the shading in a storage means, and iii) in the course of said radiation image being read out from said stimulable phosphor sheet, compensating for fluctuations in said image signal caused by the shading, in accordance with the output of said storage means.

The filter filters out light at least having wavelengths within the range of wavelengths of the stimulating rays, and transmits light having wavelengths within the range of wavelengths of the light emitted by the stimulable phosphor sheet. The filter may also transmit light having wavelengths within a range different from the ranges of wavelengths of the stimulating rays and of the light emitted by the stimulable phosphor sheet. Therefore, the phosphor sheet may produce fluorescence having wavelengths falling within the range of wavelengths of the light emitted by the stimulable phosphor sheet when the phosphor sheet is exposed to the stimulating rays. Alternatively, the phosphor sheet may produce fluorescence having wavelengths falling within a range different from the ranges of the wavelengths of the stimulating rays and of the light emitted by the stimulable phosphor sheet and which is capable of passing through the filter, when the phosphor sheet is exposed to the stimulating rays.

With the first shading elimination method for a radiation image read-out apparatus in accordance with the present invention, the fluorescence capable of being detected by the photoelectric read-out mean is produced by the phosphor sheet when it is exposed to the stimulating rays. The characteristics of the shading caused by nonuniformity in the intensity of the stimulating rays, nonuniformity in the sensitivity of the photoelectric read-out means, or the like, are detected from the fluorescence produced by the phosphor sheet without particular operations being carried out in order to uniformly irradiate radiation to the whole plane of a recording medium for testing purposes, as in the conventional technique. Therefore, the recording operations with radiation need not be carried out to eliminate shading; the shading can be eliminated accurately and easily.

The present invention further provides a second shading elimination method for a radiation image read-out apparatus wherein a stimulable phosphor sheet, which has a radiation image stored thereon, is exposed to stimulating rays which cause the stimulable phosphor sheet to emit light in proportion to the amount of energy stored thereon during exposure to radiation, and the emitted light is detected and converted into an image signal by a photoelectric read-out means, the shading elimination method comprising the steps of:

i) before said radiation image is read out from said stimulable phosphor sheet, the characteristics of the shading caused by nonuniformity in the intensity of said stimulating rays, nonuniformity in the sensitivity of said photoelectric read-out means, or the like are detected, the characteristics of the shading being detected from operations wherein a stimulable phosphor sheet, which contains a radioactive nuclide uniformly over the whole plane and which has been left standing for a predetermined time, is exposed to said stimulating rays, and light emitted by said stimulable phosphor sheet when it is exposed to said stimulating rays, is detected by said photoelectric read-out means, ii) storing said characteristics of the shading in a storage means, and iii) in the course of said radiation image being read out from said stimulable phosphor sheet, compensating for the fluctuations in said image signal caused by the shading, in accordance with the output of said storage means.

In the second shading elimination method for a radiation image read-out apparatus in accordance with the present invention, the stimulable phosphor sheet for testing purposes uniformly contains a radioactive nuclide over the whole plane so that the energy of the radiation produced by the radioactive nuclide is uniformly stored over its whole plane in the said stimulable phosphor sheet.

As the stimulable phosphor sheet which uniformly contains a radioactive nuclide over the whole plane is left to stand for a predetermined time, the energy of radiation produced by the radioactive nuclide is uniformly stored over its whole plane in the said stimulable phosphor sheet. Therefore, the stimulable phosphor sheet is uniformly exposed to radiation without a particular radiation source being used. The stimulable phosphor sheet is then exposed to the stimulating rays which cause it to emit light in proportion to the amount of energy stored thereon, and the emitted light is detected by the photoelectric read-out means in order to detect the characteristics of the shading caused by nonuniformity in the intensity of the stimulating rays, nonuniformity in the sensitivity of the photoelectric read-out means, or the like.

With the second shading elimination method for a radiation image read-out apparatus in accordance with the present invention, the characteristics of the shading caused by nonuniformity in the intensity of the stimulating rays, nonuniformity in the sensitivity of the photoelectric read-out means, or the like, can be accurately detected without particular operations being carried out in order uniformly to irradiate radiation to the whole plane of a recording medium as in the conventional technique. Therefore, the recording operations with radiation need not be carried out in order to eliminate the shading; and the shading can be eliminated accurately and easily.

In the shading elimination method for an image read-out apparatus, and the first and second shading elimination methods for a radiation image read-out apparatus in accordance with the present invention, any of the known processes may be employed in order to eliminate the shading in accordance with the shading characteristics detected insofar as the image signal can be corrected accurately therewith.

DESCRIPTION OF THE PREFERRED EMBODIMENTS

The present invention will hereinbelow be described in further detail with reference to the accompanying drawings.

Figure 1:
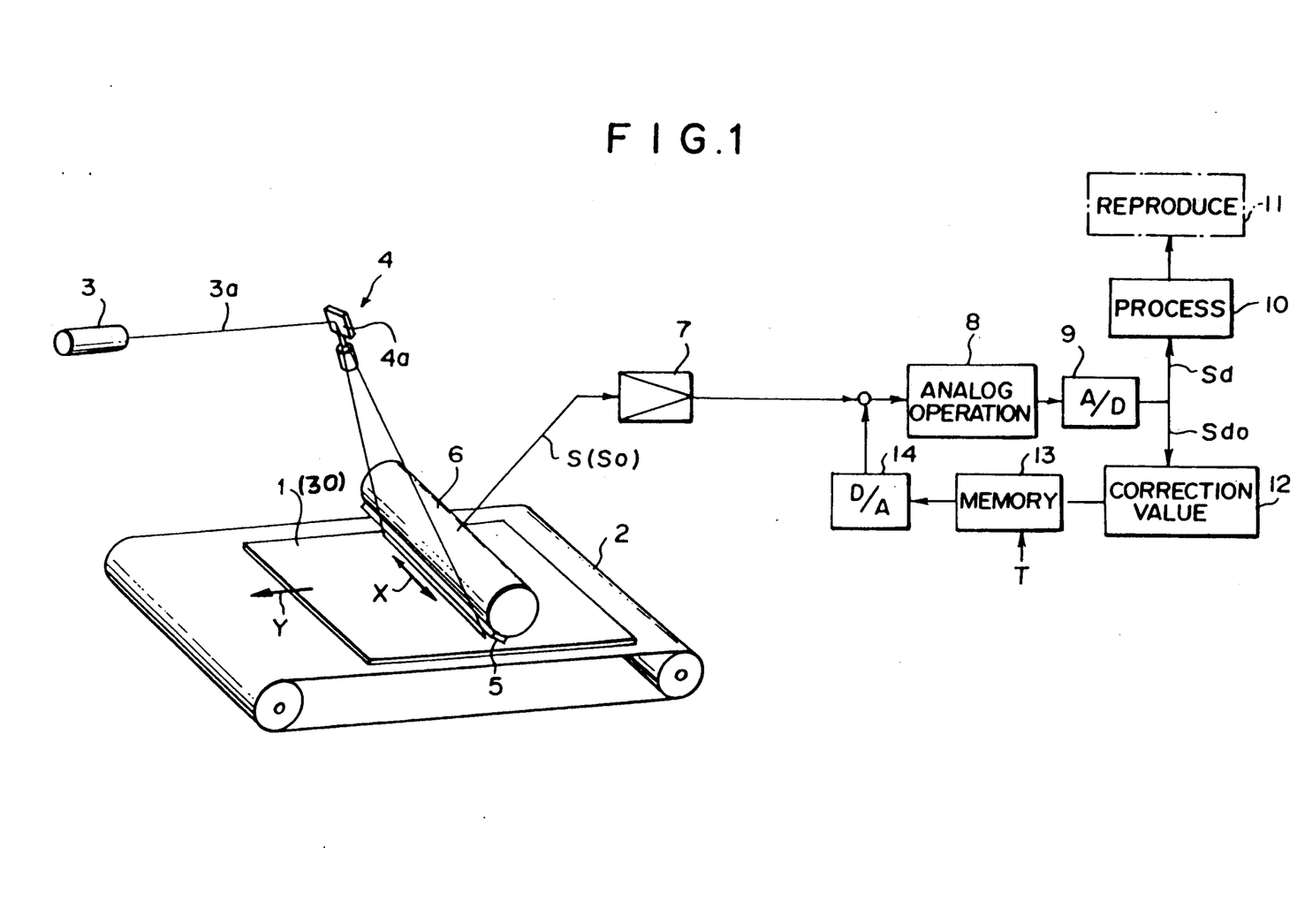
FIG. 1 is a schematic view showing an example of an image read-out apparatus wherein an embodiment of the shading elimination method for an image read-out apparatus in accordance with the present invention is employed.

With reference to FIG. 1, the image read-out apparatus shown takes on the form of, by way of example, a radiation image read-out apparatus for reading out (detecting) light emitted by a stimulable phosphor sheet on which a radiation image has been stored. The light is emitted in proportion to the amount of energy stored on the stimulable phosphor sheet during exposure to radiation. The radiation image read-out apparatus is used in a radiation image recording and reproducing system wherein a stimulable phosphor sheet is utilized. A stimulable phosphor sheet 1, on which a radiation image has been stored, is conveyed by a sheet conveyance means 2, which is constituted of an endless belt or the like, in the sub-scanning direction indicated by the arrow Y. Also, a laser beam 3a, produced by a laser beam source 3, serves as stimulating rays and is deflected by a reflecting surface 4a of a galvanometer mirror 4, which acts as a light deflector and causes the laser beam 3a to scan the stimulable phosphor sheet 1 in the main scanning direction indicated by the double headed arrow X. The main scanning direction is approximately normal to the sub-scanning direction indicated by the arrow Y. As the stimulable phosphor sheet 1 is exposed to the laser beam 3a, the exposed portion emits light in an amount proportional to the amount of energy stored thereon during exposure to radiation. The emitted light is guided by a light guide member 5, and photoelectrically detected by a long photomultiplier 6 which is positioned along the main scanning line.

An analog output signal S is generated by the long photomultiplier 6, and is amplified by a logarithmic amplifier 7. The amplified analog output signal S is fed into an analog operation means 8, and is then converted into a digital read-out image signal Sd by an A/D converter 9. The digital read-out image signal Sd thus obtained is sent to an image processing circuit 10 which carries out processing thereon, such as gradation processing and frequency response processing. The processed image signal is fed into an image reproducing apparatus 11, which may be constituted of a cathode ray tube (CRT), an optical scanning recording apparatus, or the like. The read-out image signal Sd represents the amount of light emitted by the stimulable phosphor sheet 1. Therefore, from the read-out image signal Sd, the radiation image which was stored on the stimulable phosphor sheet 1 can be reproduced as a visible image by the image reproducing apparatus 11. Instead of being immediately fed into the image reproducing apparatus 11, the read-out image signal Sd may be temporarily recorded on a recording medium such as a magnetic disk or a magnetic tape.

In the image read-out apparatus described sensitivity of the long photomultiplier 6 along the main scanning direction, or the like. When shading occurs, the level of the analog output signal S generated by the long photomultiplier 6 varies for different portions of the stimulable phosphor sheet 1, even when the same amount of energy is stored on said portions during their exposure to radiation. Therefore, in such cases, the image which was stored on the stimulable phosphor sheet 1 cannot be accurately read out. How the shading is eliminated will be described hereinbelow.

Figure 2:
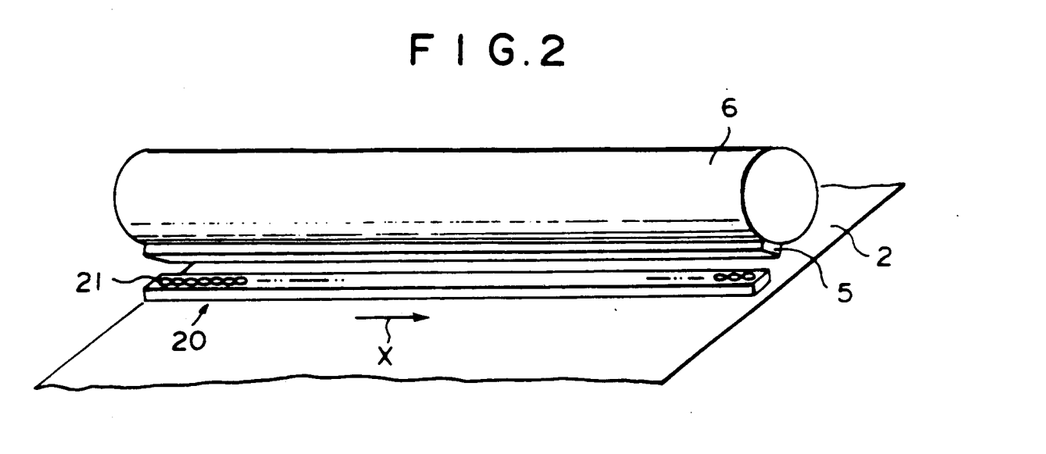
FIG. 2 is a perspective view showing a photomultiplier and a light emitting diode array.

As shown in FIG. 2, before the radiation image read-out operation is carried out as described above, a light emitting diode array 20 which serves as a linear light source is positioned on the sheet conveyance means 2 so that the light emitting diode array 20 faces the long photomultiplier 6. The light emitting diode array 20 is composed of a plurality of light emitting diodes 21, 21, ... which serve as point light sources. The light emitting diodes 21, 21, ... are turned on one after another starting with the left light emitting diode and continuing with those lying in the direction indicated by the arrow X. Light produced by the light emitting diodes 21, 21, ... is guided through the light guide member 5 and detected and converted into a reference output signal So by the long photomultiplier 6.

In general, the light receiving face of the long photomultiplier 6 is positioned so that it is in close contact with a filter which transmits light having wavelengths within the range of wavelengths of light emitted by the stimulable phosphor sheet 1 and which filters out light having wavelengths within the range of the wavelengths of the laser beam 3a, so that the laser beam 3a reflected from the stimulable phosphor sheet 1 does not enter the long photomultiplier 6. Therefore, the light emitting diodes 21, 21, ... must produce light capable of passing through the filter.

The reference output signal So is amplified by the logarithmic amplifier 7. The amplified reference output signal So is fed into the analog operation means 8, and is then converted into a digital reference output signal Sdo by the A/D converter 9 in the same manner a that described above. The digital reference output signal Sdo is fed into a correction value calculating circuit 12. By way of example, the light emitting diodes 21, 21, ... have been adjusted so that they produce light having equal intensities. Therefore, fluctuations in the digital reference output signal Sdo reflect the characteristics of the shading of the long photomultiplier 6. The correction value calculating circuit 12 calculates the mean of the components of the digital reference output signal Sdo, the number of which components is equal to the number of the light emitting diodes 21, 21, ... Thereafter, the correction value calculating circuit 12 calculates the differences between the mean and the values of the components of the digital reference output signal Sdo. The differences are stored as correction values in a memory 13. Therefore, a number of correction values whose numbers are equal to the number of the light emitting diodes 21, 21, ... are stored in the memory 13. The intensities of light produced by the light emitting diodes 21, 21, ... need not necessarily be identical with one another insofar as they are known in advance. In cases where the intensities of light produced by the light emitting diodes 21, 21, ... are not identical with one another, the correction value calculating circuit 12 calculates the differences between the intensities of light produced by the light emitting diodes 21, 21, ..., whose intensities are already known and stored in advance, and the intensities of light actually detected for the corresponding light emitting diodes 21, 21, ..., whose intensities are represented by the digital reference output signal. The correction value calculating circuit 12 then calculates correction values from a signal representing the calculated differences.

When the radiation image stored on the stimulable phosphor sheet 1 is read out in the same manner as that described above, the correction values are read from the memory 13, and then used to correct the image signal detected from the stimulable phosphor sheet 1. Specifically, a synchronizing signal T, which is synchronized t the scanning of the laser beam 3a in the main scanning direction, is fed into the memory 13, so that the correction value corresponding to a position lying in the main scanning direction on the stimulable phosphor sheet 1 is output when the image information stored at said position is read out. Therefore, the light emitting diodes 21, 21, ... should preferably be located so that their positions coincide with the positions of respective picture elements located in the main scanning direction on the stimulable phosphor sheet 1. However, in cases where the number of the light emitting diodes 21, 21, ... should be reduced, they may be located only at positions corresponding to picture elements selected at intervals, for example, odd-numbered picture elements. In such cases, the intensities of light produced by the light emitting diodes 21, 21, ... are detected in order to calculate only the correction values for said picture elements. The correction values are stored in the memory 13. The correction values are then read from the memory 13 and interpolated in order to calculate correction values for the other picture elements.

The correction values which are released so that they correspond to the positions at which the laser beam $3a$ scans are converted into an analog signal by an D/A converter 14, and the analog signal is fed as a correction signal into the analog operation means 8 together with the image signal which was photoelectrically detected from the stimulable phosphor sheet 1. Though the image signal is adversely affected by shading, it is corrected on the basis of the correction signal. Therefore, fluctuations in the image signal caused by shading can be eliminated, and the image which was stored on the stimulable phosphor sheet 1 can be accurately read out.

How the correction values are used to eliminate the shading is not limited, provided that the image signal ultimately obtained from the image read-out apparatus 20 is free of the adverse effects of shading. For example, instead of the image signal being directly changed as in the aforesaid embodiment, the sensitivity of the long photomultiplier 6 or the energy of the laser beam $3a$ may be changed in accordance with the shading characteristics. Also, instead of being constituted of the long photomultiplier 6, the photoelectric read-out means may be constituted of a combination of a large light guide member with a small photomultiplier, or may be constituted of a line sensor. Instead of being constituted of the light emitting diodes, 21, 21, ..., the linear light source may be constituted of an electroluminescence device, a plasma display panel, a liquid crystal shutter array or the like.

The shading elimination method for an image read-out apparatus in accordance with the present invention is applicable not only to an apparatus, wherein the amount of light emitted by a stimulable phosphor sheet proportional to the amount of energy stored on the stimulable phosphor sheet during exposure to radiation is detected, but also to any other image read-out apparatuses wherein light which has been reflected by a recording medium and which carries information about the image recorded on the recording medium is detected, or wherein light which has passed through the recording medium and which carries the information about the image recorded on the recording medium is detected.

An embodiment of the first shading elimination method for a radiation image read-out apparatus in accordance with the present invention will be described hereinbelow.

Figure 3:
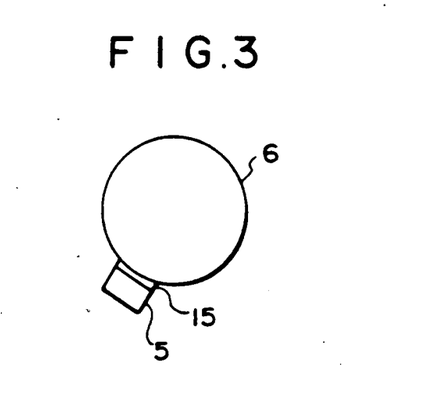
FIG. 3 is a side view showing a photomultiplier.

In this embodiment, the laser beam source 3 of the radiation image read-out apparatus shown in FIG. 1 is constituted of a He-Ne laser. The wavelength of the laser beam $3a$ is 632.8 nm. The stimulable phosphor sheet 1 is provided with a layer of a stimulable phosphor represented by the formula $BaFBr:Eu^{2+1}$. *When being exposed to the laser beam $3a$* having a wavelength of 632.8 nm, the stimulable phosphor sheet 1 emits light having a peak intensity around a wavelength of 390 nm. Also, as shown in FIG. 3, the light receiving face of the long photomultiplier 6 is positioned so that it is in close contact with a filter 15 which transmits light having wavelengths within the range of wavelengths of light emitted by the stimulable phosphor sheet 1, and which filters out light having wavelengths within the range of wavelengths of the laser beam $3a$, so that the laser beam $3a$ reflected from the stimulable phosphor sheet 1 does not enter the long photomultiplier 6. By way of example, the filter 15 is constituted of B-370 supplied by Hoya Corp. and exhibits spectral transmittance characteristics shown in FIG. 4.

The light which has been emitted by the stimulable phosphor sheet 1 and has passed through the filter 15 is photoelectrically detected and converted into an analog output signal S by the long photomultiplier 6. In the same manner as that described above, the analog output signal S is amplified by the logarithmic amplifier 7. The amplified analog output signal S is fed into the analog operation means 8, and is then converted into a digital read-out image signal Sd by the A/D converter 9. The digital read-out image signal Sd thus obtained is processed by the image processing circuit 10, and the processed image signal is fed into the image reproducing apparatus 11.

In the radiation image read-out apparatus described above, shading is often caused by nonuniformity in the intensity of the laser beam $3a$, whose nonuniformity in turn is caused by nonuniformity in the reflectivity of the reflecting surface $4a$ of the galvanometer mirror 4. Shading is also caused by nonuniformity in the speed at which the laser beam $3a$ scans the stimulable phosphor sheet 1; this nonuniformity is caused by fluctuations in the speed at which the galvanometer mirror 4 deflects the laser beam $3a$. Moreover, shading is caused by nonuniformity in how the light emitted by the stimulable phosphor sheet 1 is guided by the light guide member 5 (i.e. nonuniformity in the light guiding efficiency at, for example, end portions of the light guide member 5), nonuniformity in the sensitivity of the long photomultiplier 6 along the main scanning direction, or the like. When shading occurs, the level of the analog output signal S generated by the long photomultiplier 6 varies for different portions of the stimulable phosphor sheet 1, even when the same amount of energy is stored on said portions during their exposure to radiation. Therefore, in such cases, the image which was stored on the stimulable phosphor sheet 1 cannot be read out accurately. How the shading is eliminated will be described hereinbelow.

Figure 4:
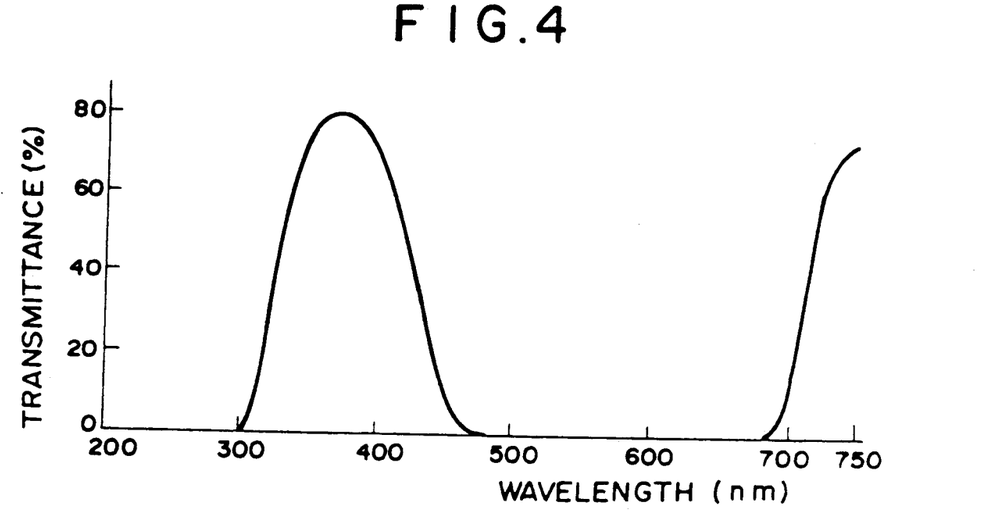
FIGS. 4, 12 and 13 are graphs showing spectral transmittance characteristics of filters.
Figure 5:
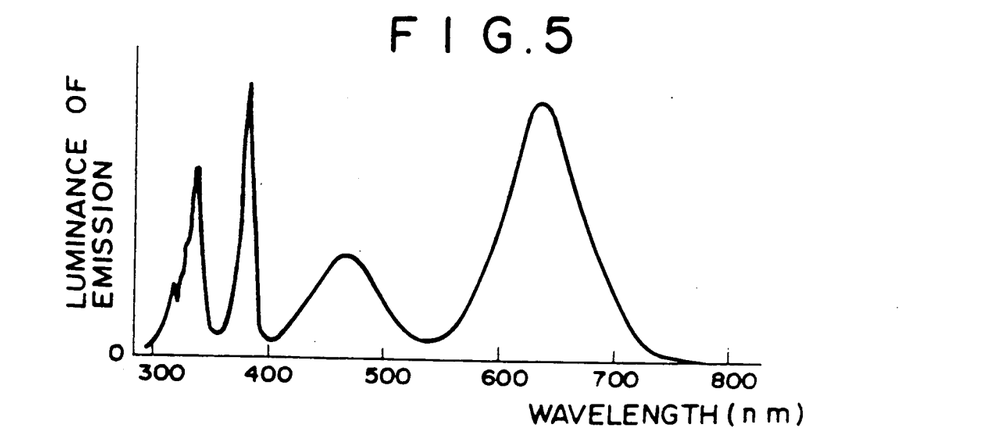
FIGS. 5 and 14 are graphs showing stimulation spectra of phosphor sheets for testing purposes.
Figure 6:
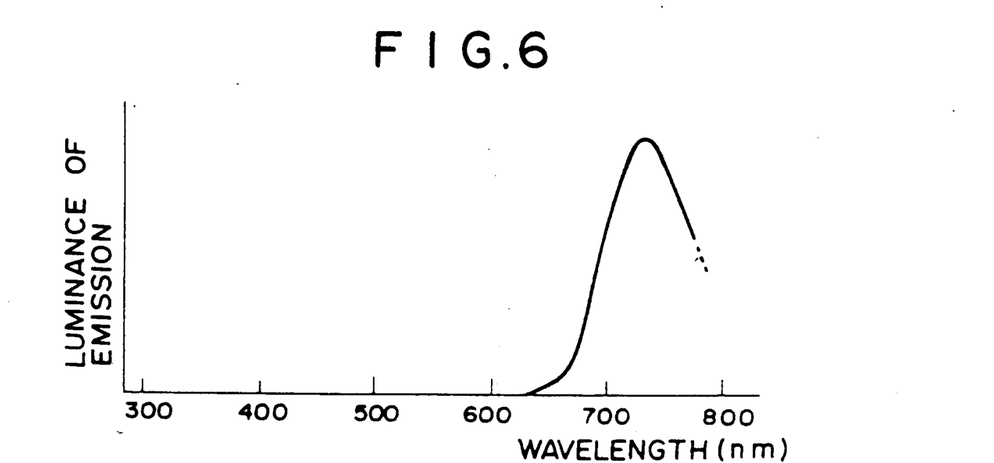
FIG. 6 is a graph showing a fluorescent spectrum of a phosphor sheet for testing purposes.

Before the radiation image is read out from the stimulable phosphor sheet 1 in the manner described above, a phosphor sheet for testing purposes 30 which produces the fluorescence capable of passing through the filter 15 when being exposed to the laser beam $3a$ having a wavelength of 632.8 nm is subjected to an image read-out operation in the same manner as that for the stimulable phosphor sheet 1. The phosphor sheet 30 has a phosphor layer which comprises a binder and a phosphor represented by the formula $\gamma AlF_3:Fe^{3+}$ and dispersed in the binder. FIGS. 5 and 6 show the stimulation spectrum and the light emission spectrum of the phosphor sheet 30. In the same manner as that for the stimulable phosphor sheet 1, the phosphor sheet 30 is positioned on the sheet conveyance means 2 and conveyed thereby in the direction indicated by the arrow Y so that the whole plane of the phosphor sheet 30 is exposed to the laser beam $3a$. When being exposed to the laser beam having a wavelength of 632.8 nm (instead of being exposed to radiation), the phosphor sheet 30 produces fluorescence having a peak intensity around a wavelength of 750 nm. As shown in FIG. 4, the filter 15 substantially transmits light having wavelengths around 750 nm. Therefore, the fluorescence produced by the phosphor sheet 30 and having a predetermined intensity passes through the filter 15 and is detected and converted into a reference output signal So by the long photomultiplier 6.

The reference output signal So is amplified by the logarithmic amplifier 7. The amplified reference output signal So is fed into the analog operation mean 8, and is then converted into a digital reference output signal Sdo by the A/D converter 9 in the same manner as that described above. The digital reference output signal Sdo is fed into the correction value calculating circuit 12. The correction value calculating circuit 12 determines fluctuations of the digital reference output signal Sdo, which represents the image information stored at respective picture elements arrayed along the main scanning direction. (The fluctuations are caused by shading, and represent the characteristics of the shading.)

Figure 7:
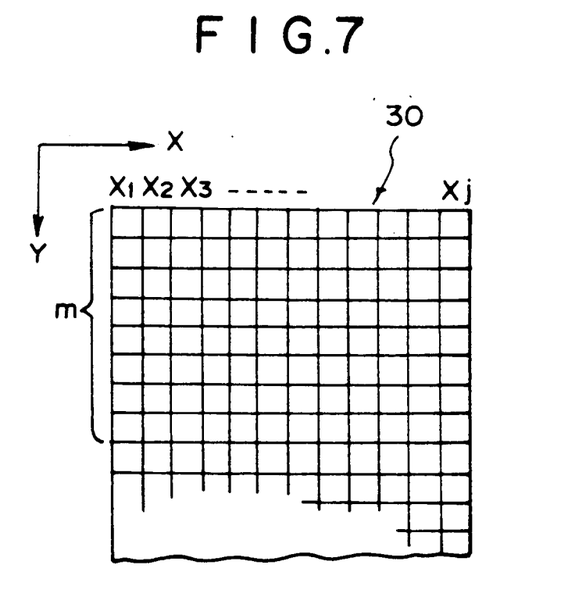
FIG. 7 is an explanatory view showing how the shading is eliminated by an embodiment of the first shading elimination method for a radiation image read-out apparatus in accordance with the present invention.

Specifically, as shown in FIG. 7, j number of picture element columns X1, X2, X3, . . . , Xj are arrayed along the main scanning direction X on the phosphor sheet 30. For each of the columns X1, X2, X3, . . . , Xj, the correction value calculating circuit 12 calculates the mean value of the components of the digital reference output signal Sdo corresponding to the picture elements which belong to m number of picture element rows arrayed along the sub-scanning direction Y. The means calculated in this manner are employed as representative signal values R1, R2, R3, . . . , Rj. Thereafter, the correction value calculating circuit 12 calculates the mean Ro of the representative signal values R1, R2, R3, . . . , Rj. The correction value calculating circuit 12 also calculates the differences U1, U2, U3, . . . , Uj between the mean value Ro and the respective representative signal values R1, R2, R3, . . . , Rj. The differences U1, U2, U3, . . . , Uj are stored as correction values in the memory 13.

When the radiation image stored on the stimulable phosphor sheet 1 is read out in the same manner as that described above, the correction values U1, U2, U3, . . . , Uj are sequentially read from the memory 13, and used to correct the image signal detected from the stimulable phosphor sheet 1. Specifically, a synchronizing signal T, which is synchronized to the scanning of the laser beam 3a in the main scanning direction, is fed into the memory 13, so that the correction values Un corresponding to the picture elements of an n'th column arrayed in the main scanning direction are output when the image information stored at said picture elements is read out. The correction values U1, U2, U3, . . . , Uj are converted into an analog signal by the D/A converter 14, and the analog signal is fed as a correction signal into the analog operation means 8 together with the image signal which was photoelectrically detected from the stimulable phosphor sheet 1. Though the image signal is adversely affected by shading, it is corrected on the basis of the correction signal. Therefore, fluctuations in the image signal caused by shading can be eliminated, and the image which was stored on the stimulable phosphor sheet 1 can be accurately read out.

It is only necessary that the phosphor sheet produces fluorescence capable of passing through the filter, which is positioned so that it is in close contact with the light receiving face of the long photomultiplier, when the phosphor sheet is exposed to stimulating rays. As in the aforesaid embodiment, the phosphor sheet may produce fluorescence having wavelengths longer than the wavelengths of the light emitted by the stimulable phosphor sheet. It is also possible to use a phosphor sheet which produces fluorescence having wavelengths close to the wavelengths of the light emitted by the stimulable phosphor sheet. Embodiments wherein a phosphor sheet which produces fluorescence having wavelengths close to the wavelengths of the light emitted by the stimulable phosphor sheet is used will be described hereinbelow.

In cases where, instead of the He-Ne laser being used, a GaAs semiconductor laser which emits a laser beam having a wavelength of 850 nm is used as the stimulating ray source, a stimulable phosphor sheet which can be stimulated by said laser beam is used. By way of example, such a stimulable phosphor sheet may be constituted of a layer of a stimulable phosphor as disclosed in Japanese Unexamined Patent Publication No. 61(1986)-72089, whose stimulable phosphor is represented by the formula $M^I X.aM^{II} X'_2.bM^{III} X''_3 :cA$ Wherein $M^I$ is at least one alkaline metal selected from the group consisting of Li, Na, K, Rb, and Cs and includes at least one of Rb and Cs. $M^{II}$ is at least one bivalent metal selected from the group consisting of Be, Mg, Ca, Sr, Ba, Zn, Cd, Su, and Ni. $M^{III}$ is at least one trivalent metal selected from the group consisting of Sc, Y, La, Ce, Pr, Nd, Pm, Sm, Eu, Gd, Tb, Dy, Ho, Er, Tm, Yb, Lu, Al, Ga, and In. Each of X, X', and X'' is at least one halogen selected from the group consisting of F, Cl, Br, and I. A is at least one metal selected from the group consisting of Tl, Na, Ag, and Cu. a is a number satisfying $0 \leq a \leq 1$. b is a number satisfying $0 \leq b \leq 0.5$. c is a number satisfying $0 < c \leq 0.2$. Alternatively, the stimulable phosphor sheet may be constituted of a layer of stimulable phosphor as disclosed in Japanese Unexamined Patent Publication No. 62(1987)-209187, in which the stimulable phosphor is represented by the formula $M^I X.aM^{II} X'_2.bTl$; wherein $M^I$ is at least one alkaline metal selected from the group consisting of Na, K, Rb and Cs; $M^{II}$ is at least one bivalent metal selected from the group consisting of Mg, Ca, Sr, Ba, Zn, Cd, Cu, and Ni; each of X and X' is at least one halogen selected from the group consisting of F, Cl, Br and I; a is a number satisfying $0 \leq a \leq 4.0$; and b is a number satisfying $0 < b \leq 0.2$.

Figure 8:
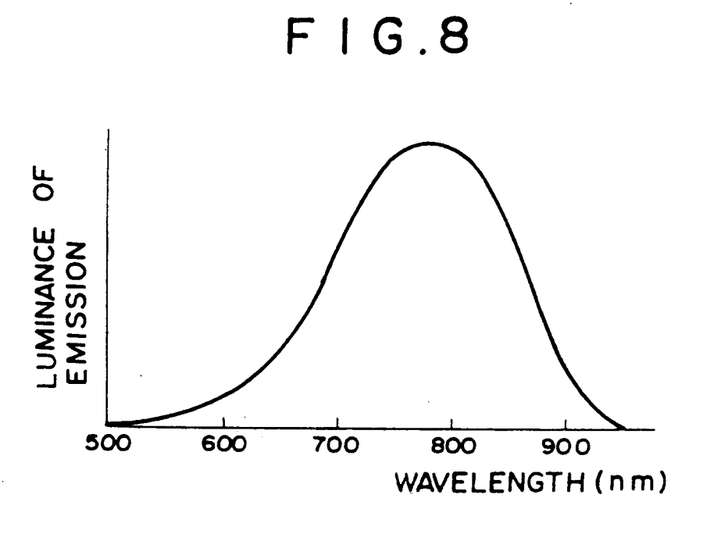
FIGS. 8 and 10 are graphs showing stimulation spectra of stimulable phosphor sheets.
Figure 9:
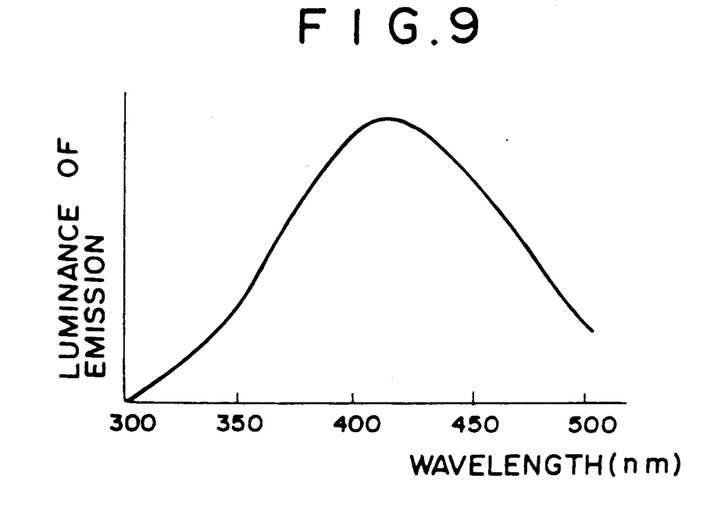
FIGS. 9 and 11 are graphs showing light emission spectra of stimulable phosphor sheets.
Figure 10:
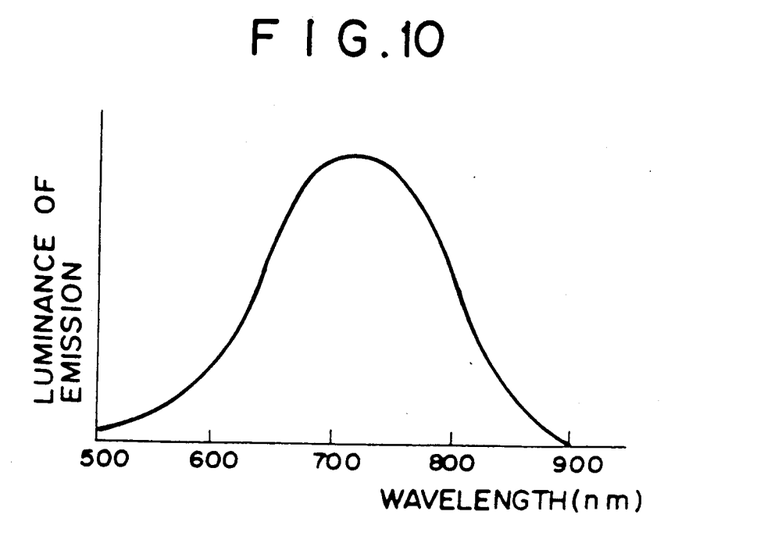
Figure 11:
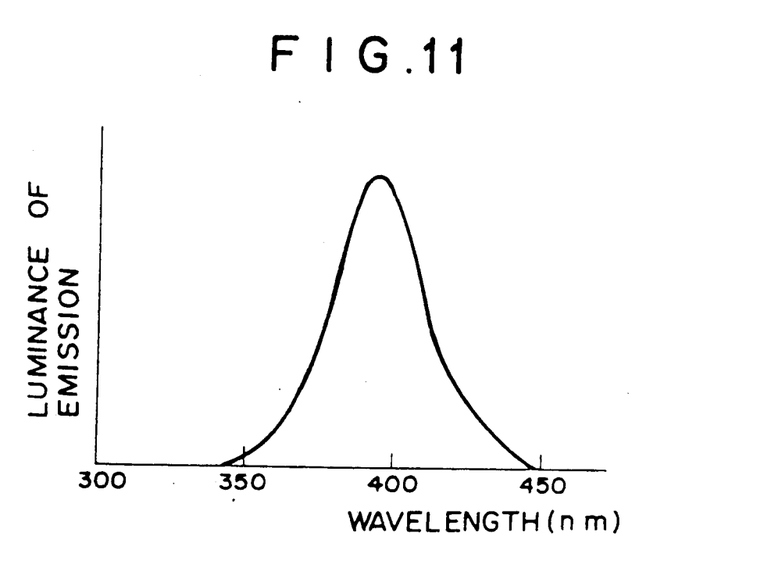

FIGS. 8 and 9 are graphs showing the stimulation spectrum and the light emission spectrum of the stimulable phosphor sheet constituted of a layer of a stimulable phosphor represented by the formula $CsI.0.05BaF_2.0.01AlF_3:0.02Na$. FIGS. 10 and 11 are graphs showing the stimulation spectrum and the light emission spectrum of the stimulable phosphor sheet constituted of a layer of a stimulable phosphor represented by the formula $RbBr.0.5BaFBr:0.01Tl$. As is clear from these graphs, the two types of stimulable phosphor sheets described above emit light having wavelengths around 400 nm, when being stimulated by stimulating rays having a wavelength of 850 nm.

Figure 12:
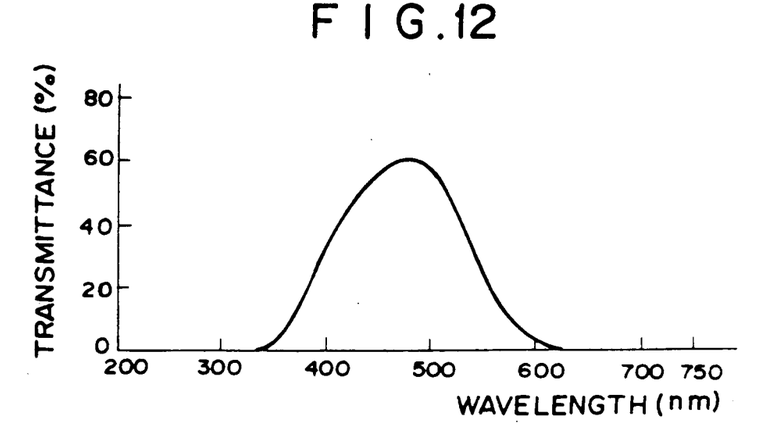
Figure 13:
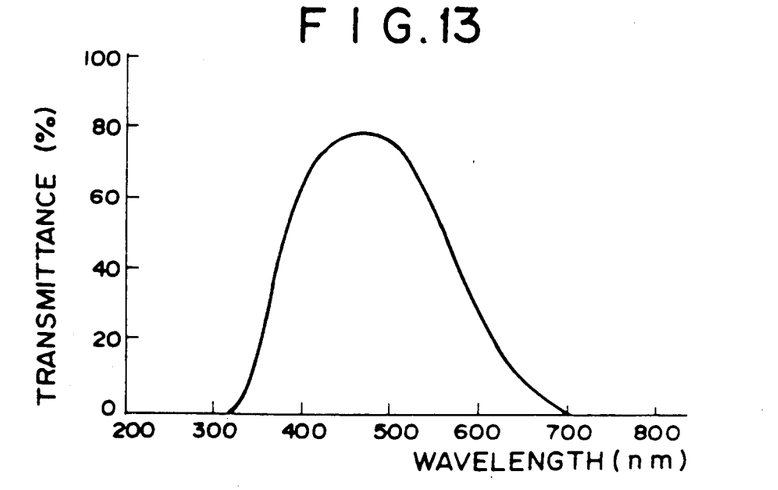

In cases where stimulating rays having a wavelength of 850 nm and the stimulable phosphor sheet constituted of a layer of a stimulable phosphor represented by the formula $CsI.0.05BaF_2.0.01AlF_3:0.02Na$ are used, the filter positioned so that it is in close contact with the light receiving face of the long photomultiplier is constituted of B-480 which is supplied by Hoya Corp. and which exhibits spectral transmittance characteristics shown in FIG. 12. In cases where stimulating rays having a wavelength of 850 nm and the stimulable phosphor sheet constituted of a layer of a stimulable phosphor represented by the formula $RbBr.0.5BaFBr:0.01Tl$ are used, the filter is constituted of B-48 which is supplied by Toshiba Glass Co., Ltd. and which exhibits the spectral transmittance characteristics shown in FIG. 13. Though only the spectral transmittance characteristics for the wavelengths in the region shorter than 750 nm are shown in FIG. 12, the filter B-480 exhibits very low transmittances with respect to light having wavelengths within the infrared region. (For example, the transmittance is $9 \times 10^{-3}\%$ for light having a wavelength of 850 nm, 0.01% for light having a wavelength of 900 nm, and 0.08% for light having a wavelength of 1,000 nm.) In cases where the long photomultiplier is provided with such a filter, it can detect light emitted by the stimulable phosphor sheet, whose light has wavelengths around 400 nm, while stimulating rays which have a wavelength of 850 nm and which are reflected by the stimulable phosphor sheet are filtered out by the filter.

Figure 14:
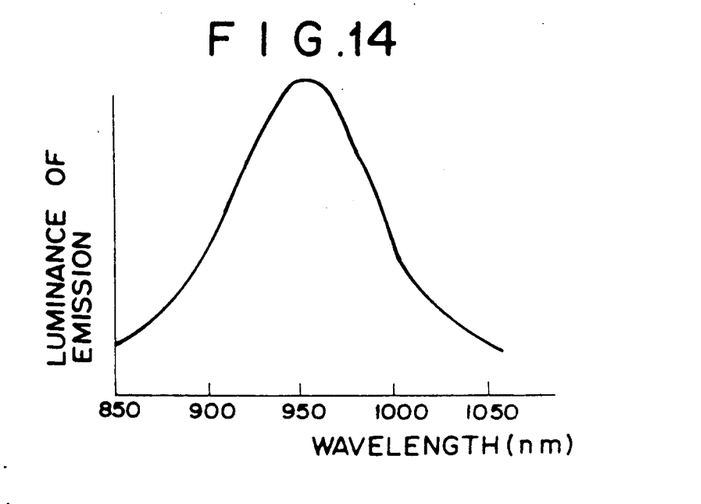

In the embodiments just described above, a phosphor sheet is used which is provided with a phosphor layer comprising a binder and a phosphor represented by the formula $NaYb(WO_4)_2$:Er and dispersed in the binder. The phosphor sheet exhibits the stimulation spectrum shown in FIG. 14, and produces the fluorescence when being exposed to stimulating rays having a wavelength of 850 nm. The fluorescence produced by the phosphor sheet has a peak intensity around a wavelength of 525 nm, and therefore can substantially pass through the filters having the spectral transmittance characteristics shown in FIGS. 12 and 13. With these embodiments, before the radiation image is read out from the stimulable phosphor sheet, the phosphor sheet is scanned with stimulating rays causing it to produce the fluorescence, and the fluorescence is detected by the photoelectric read-out means. Therefore, the characteristics of the shading can be detected from the fluorescence without particular operations being carried out in order to irradiate radiation uniformly to the whole plane of the recording medium for a test as in the conventional technique.

In the first shading elimination method for a radiation image read-out apparatus in accordance with the present invention, instead of one of the two types of phosphor sheets being used, one of various other types of phosphor sheets may be selected as the phosphor sheet in accordance with the wavelength of stimulating rays and the characteristics of the filter. For example, a phosphor sheet which is provided with a layer of an infrared-to-visible light converting phosphor, for example, a certain type of a rare earth element phosphor, which absorbs light having long wavelengths and produces the fluorescence having short wavelengths through quantum counting effects or multi-stage energy transmission may be used for testing purposes.

An embodiment of the second shading elimination method for a radiation image read-out apparatus in accordance with the present invention will be described hereinbelow.

In this embodiment, shading caused by nonuniformity in the intensity of the laser beam 3a, nonuniformity in the speed at which the laser beam 3a scans the stimulable phosphor sheet 1, nonuniformity in the sensitivity of the long photomultiplier 6 along the main scanning direction, or the like, is eliminated in the manner described below.

Before the radiation image is read out from the stimulable phosphor sheet 1 with the radiation image read-out apparatus shown in FIG. 1, a stimulable phosphor sheet 30, which contains a radioactive nuclide, is subjected to an image read-out operation in the same manner as that for the stimulable phosphor sheet 1. By way of example, the stimulable phosphor sheet 30 is provided with a layer of a stimulable phosphor represented by the formula $BaFX:Eu^{2+}$ wherein X is at least one of Cl, Br, and I. As shown in FIG. 1, the stimulable phosphor sheet 30 has the same shape as the stimulable phosphor sheet 1. By way of example, the stimulable phosphor sheet 30 contains a radioactive nuclide Ra226 in the stimulable phosphor, or a radioactive nuclide C14 in the binder. The radioactive nuclide Ra226 or C14 is uniformly dispersed over the whole area of the stimulable phosphor sheet 30. The stimulable phosphor sheet 30 is left to stand for a time until the energy of the radiation produced by the radioactive nuclide Ra226 or C14 is substantially and uniformly stored over the whole plane of the stimulable phosphor sheet. The stimulable phosphor sheet 30 is then set on the means of sheet conveyance 2. The time for which the stimulable phosphor sheet 30 is left to stand need not necessarily be set to a particular value. In cases where the stimulable phosphor sheet 30 should not store an excessive amount of radiation, the stimulable phosphor sheet 30 may be exposed to erasing light once in order to release the energy stored thereon. Thereafter, the stimulable phosphor sheet 30 may be left to stand for a predetermined time and fed into the radiation image read-out apparatus.

The stimulable phosphor sheet 30 which has been set on the sheet conveyance means 2 is scanned with the laser beam 3a in the same manner as that for the stimulable phosphor sheet 1. During the scanning, the stimulable phosphor sheet 30 emits light having uniform intensity. The emitted light is guided through the light guide member 5 and is detected and converted into a reference output signal So by the long photomultiplier 6. The reference output signal So is amplified by the logarithmic amplifier 7. The amplified reference output signal So is fed into the analog operation means 8, and is then converted into a digital reference output signal Sdo by the A/D converter 9, in the same manner as that described above. The digital reference output signal Sdo is fed into the correction value calculating circuit 12. The correction value calculating circuit 12 detects fluctuations of the digital reference output signal Sdo which represents the image information stored at respective picture elements arrayed along the main scanning direction. (The fluctuations are caused by shading, and represent the characteristics of the shading.)

Specifically, the correction value calculating circuit 12 calculates the correction values U1, U2, U3, ..., Uj, from the digital reference output signal Sdo in the same manner as that described for the embodiment of the first shading elimination method for a radiation image read-out apparatus in accordance with the present invention with reference to FIG. 7. The correction values are stored in the memory 13.

When the radiation image stored on the stimulable phosphor sheet 1 is read out in the same manner as that described above, the correction values U1, U2, U3, ... , Uj are sequentially read from the memory 13 as the synchronizing signal T is fed into the memory 13 in the same manner as that described for the embodiment of the first shading elimination method for a radiation image read-out apparatus in accordance with the present invention. The correction values U1, U2, U3, ... , Uj are used to correct the image signal detected from the stimulable phosphor sheet 1.

The radioactive nuclide which is dispersed in the stimulable phosphor sheet 30 is not limited to Ra226 and C14, and may be selected from those having an appropriate half-life and an appropriate radiation intensity. However, the radioactive nuclide should preferably be a radioactive isotope of the same element as the constituent of the stimulable phosphor or the binder, or a radioactive isotope of an element belonging to the same group as the constituent of the stimulable phosphor or the binder. This is because such a radioactive isotope can form a solid solution with the constituent of the stimulable phosphor or the binder, and can thus be uniformly distributed therein.

In the first and second shading elimination methods for a radiation image read-out apparatus in accordance with the present invention, how the correction values are used to eliminate the shading is not limited provided that the image signal ultimately obtained from the radiation image read-out apparatus is free of the adverse effects of the shading. For example, instead of the image signal being directly changed as in the aforesaid embodiment, the sensitivity of the long photomultiplier 6 or the energy of the laser beam 3a may be changed in accordance with the characteristics of the shading. Also, instead of being constituted of the long photomultiplier 6, the photoelectric read-out means may be constituted of a combination of a large light guide member with a small photomultiplier, or may be constituted of a line sensor.

I claim:

1. A shading elimination method for an image read-out apparatus wherein a recording medium which has an image recorded thereon is exposed to a light beam, and light which is emitted from the recording medium and which carries information about the image is detected and converted into an image signal by a photoelectric read-out means, the shading elimination method comprising the steps of:
i) before said image is read out from said recording medium the characteristics of the shading caused by nonuniformity in the said photoelectric read-out means detects the light which is emitted from said recording medium, or the like are detected, the characteristics of the shading being detected from operations wherein a linear light source, composed of a plurality of point light sources arrayed linearly with their intensities of light measured in advance, is positioned facing said photoelectric read-out means; said point light sources are sequentially turned on; the intensities of the light produced by said point light sources are detected by said photoelectric read-out means; and the intensities of the light thus detected are compared with said intensities of light which have been measured in advance,
ii) storing said characteristics of the shading in a storage means, and
iii) in the course of said image being read out from said recording medium, compensating for fluctuations in said image signal, which are caused by the shading, in accordance with the output of said storage means.

2. A shading elimination method for an image read-out apparatus as defined in claim 1, wherein said recording medium is a stimulable phosphor sheet on which said image has been stored in the form of a radiation image; and said light which is emitted from said recording medium and which carries information about the image is light emitted by said stimulable phosphor sheet when said stimulable phosphor sheet is scanned with stimulating rays which serve as said light beam, the amount of which light is proportional to the amount of energy stored on said stimulable phosphor sheet during exposure to radiation.

3. A shading elimination method for an image read-out apparatus as defined in claim 1, wherein said photoelectric read-out means is constituted of a long photomultiplier.

4. A shading elimination method for an image read-out apparatus as defined in claim 1, wherein said linear light source is a light emitting diode array composed of a plurality of light emitting diodes which serve as said point light sources.

5. A shading elimination method for an image read-out apparatus as defined in claim 1, wherein said light beam is a laser beam.

6. A shading elimination method for a radiation image read-out apparatus, wherein a stimulable phosphor sheet which has a radiation image stored thereon is exposed to stimulating rays causing the stimulable phosphor sheet to emit light in proportion to the amount of energy stored thereon during exposure to radiation; and the emitted light is detected and converted into an image signal by a photoelectric read-out means provided with a filter which filters out light having wavelengths within the range of wavelengths of the stimulating rays, and transmits light having wavelengths within the range of wavelengths of the emitted light, the shading elimination method comprising the steps of:
i) before said radiation image is read out from said stimulable phosphor sheet, the characteristics of the shading caused by nonuniformity in the intensity of said stimulating rays, nonuniformity in the sensitivity of said photoelectric read-out means, or the like are detected, the characteristics of the shading being detected from operations wherein a test phosphor sheet for testing, which produces fluorescence capable of passing through said filter upon being exposed to said stimulating rays, is exposed to said stimulating rays, and the fluorescence produced by said test phosphor sheet is detected by said photoelectric read-out means,
ii) storing said characteristics of the shading in a storage means, and
iii) in the course of the said radiation image being read out from said stimulable phosphor sheet, compensating for fluctuations in said image signal caused by shading, in accordance with the output of said storage means.

7. A shading elimination method for a radiation image read-out apparatus as defined in claim 6, wherein said test phosphor sheet produces the fluorescence, which has wavelengths falling within the range of wavelengths of said light emitted by said stimulable test phosphor sheet, when said phosphor sheet is exposed to said stimulating rays.

8. A shading elimination method for a radiation image read-out apparatus as defined in claim 6, wherein said filter also transmits light having wavelengths within a range different from the ranges of wavelengths of said stimulating rays and of said light emitted by said stimulable phosphor sheet; and said test phosphor sheet produces fluorescence, which has wavelengths falling within a range different from the ranges of wavelengths of said stimulating rays and of said light emitted by said stimulable phosphor sheet, and which is capable of passing through said filter when said test phosphor sheet is exposed to said stimulating rays.

9. A shading elimination method for a radiation image read-out apparatus as defined in claim 6, wherein said photoelectric read-out means is constituted of a long photomultiplier.

10. A shading elimination method for a radiation image read-out apparatus as defined in claim 6, wherein said stimulating rays are a laser beam.

11. A shading elimination method for a radiation image read-out apparatus, wherein a stimulable phosphor sheet which has a radiation image stored thereon is exposed to stimulating rays which cause the stimulable phosphor sheet to emit light in proportion to the amount of energy stored thereon during exposure to radiation, and the emitted light is detected and converted into an image signal by a photoelectric read-out means, the shading elimination method comprising the steps of:

i) before said radiation image is read out from said stimulable phosphor sheet, the characteristics of the shading caused by nonuniformity in the intensity of said stimulating rays, nonuniformity in the sensitivity of said photoelectric read-out means, or the like are detected, the characteristics of the shading being detected from operations wherein a stimulable phosphor sheet, which contains uniformly over the whole plane a radioactive nuclide and which has been left to stand for a predetermined time, is exposed to said stimulating rays, and light emitted by said stimulable phosphor sheet when it is exposed to said stimulating rays, is detected by said photoelectric read-out means, ii) storing said characteristics of the shading in a storage means, and iii) in the course of said radiation image being read out from said stimulable phosphor sheet, compensating for fluctuations in said image signal caused by the shading, in accordance with the output of said storage means.

12. A shading elimination method for a radiation image read-out apparatus as defined in claim 11, wherein said stimulable phosphor sheet is provided with a stimulable phosphor layer which comprises a binder and a stimulable phosphor dispersed therein, and said radioactive nuclide is a radioactive isotope of the same element as the constituent of said stimulable phosphor or said binder.

13. A shading elimination method for a radiation image read-out apparatus as defined in claim 11, wherein said stimulable phosphor sheet is provided with a stimulable phosphor layer comprising a binder and a stimulable phosphor dispersed therein, and said radioactive nuclide is a radioactive isotope of an element belonging to the same group as the constituent of said stimulable phosphor or said binder.

14. A shading elimination method for a radiation image read-out apparatus as defined in claim 11, wherein said photoelectric read-out means is constituted of a long photomultiplier.

15. A shading elimination method for a radiation image read-out apparatus as defined in claim 11, wherein said stimulating rays are a laser beam.

* * * * *